United States Patent [19]

Tomita et al.

[11] Patent Number: 4,645,065
[45] Date of Patent: Feb. 24, 1987

[54] APPARATUS FOR FEEDING WASTE TIRE CHIPS

[75] Inventors: Yukio Tomita, Osaka; Takayuki Wakabayashi, Takatsuki; Mitsunobu Matsuda, Kawanishi; Nobuji Shibamoto, Nara; Yoshihiro Yamashiro, Takatsuki, all of Japan

[73] Assignee: Hitachi Zosen Corporation, Osaka, Japan

[21] Appl. No.: 707,910

[22] Filed: Mar. 4, 1985

[30] Foreign Application Priority Data

Aug. 11, 1984 [JP] Japan ................................. 59-123366

[51] Int. Cl.4 ............................................ B65G 43/08
[52] U.S. Cl. ................................. 198/573; 198/550.10
[58] Field of Search ............... 198/572, 524, 543, 545, 198/573, 550.10, 444, 676, 763, 548, 571

[56] References Cited

U.S. PATENT DOCUMENTS

| | | | |
|---|---|---|---|
| 1,757,341 | 5/1930 | Smit | 198/548 X |
| 2,430,407 | 11/1947 | Nelson | 198/524 X |
| 2,675,120 | 4/1954 | Autenrieth et al. | 198/524 |
| 3,425,535 | 2/1969 | Evans | 198/763 |
| 4,513,882 | 4/1985 | Cabi-Akman | 198/571 X |

Primary Examiner—Robert J. Spar
Assistant Examiner—Jonathan D. Holmes
Attorney, Agent, or Firm—Joseph W. Farley

[57] ABSTRACT

An apparatus for feeding waste tire chips (12) to an incinerator (11) having a feed chute (13) comprises a container (17) provided with a screw feeder (22, 23) at its bottom, upper and lower two vibrating feeders (24A), (24B), and a transfer conveyor (36) extending between the lower vibrating feeder (24B) and the feed chute (13). The screw feeder (22, 23) is controlled by a first controller (34) in response to an output signal from a first photoswitch (33) which is mounted on the upper vibrating feeder (24A) for detecting the quantity of chips delivered from the container (17). The transfer conveyor (36) and the lower vibrating feeder (24B) are controlled by a second controller (42) in accordance with an output signal from a second photoswitch (41) which is mounted on the feed chute (13) for detecting the quantity of chips to be fed to the incinerator (11) at a time. The upper vibrating feeder (24A) is intermittently operated by a third controller (43).

3 Claims, 1 Drawing Figure

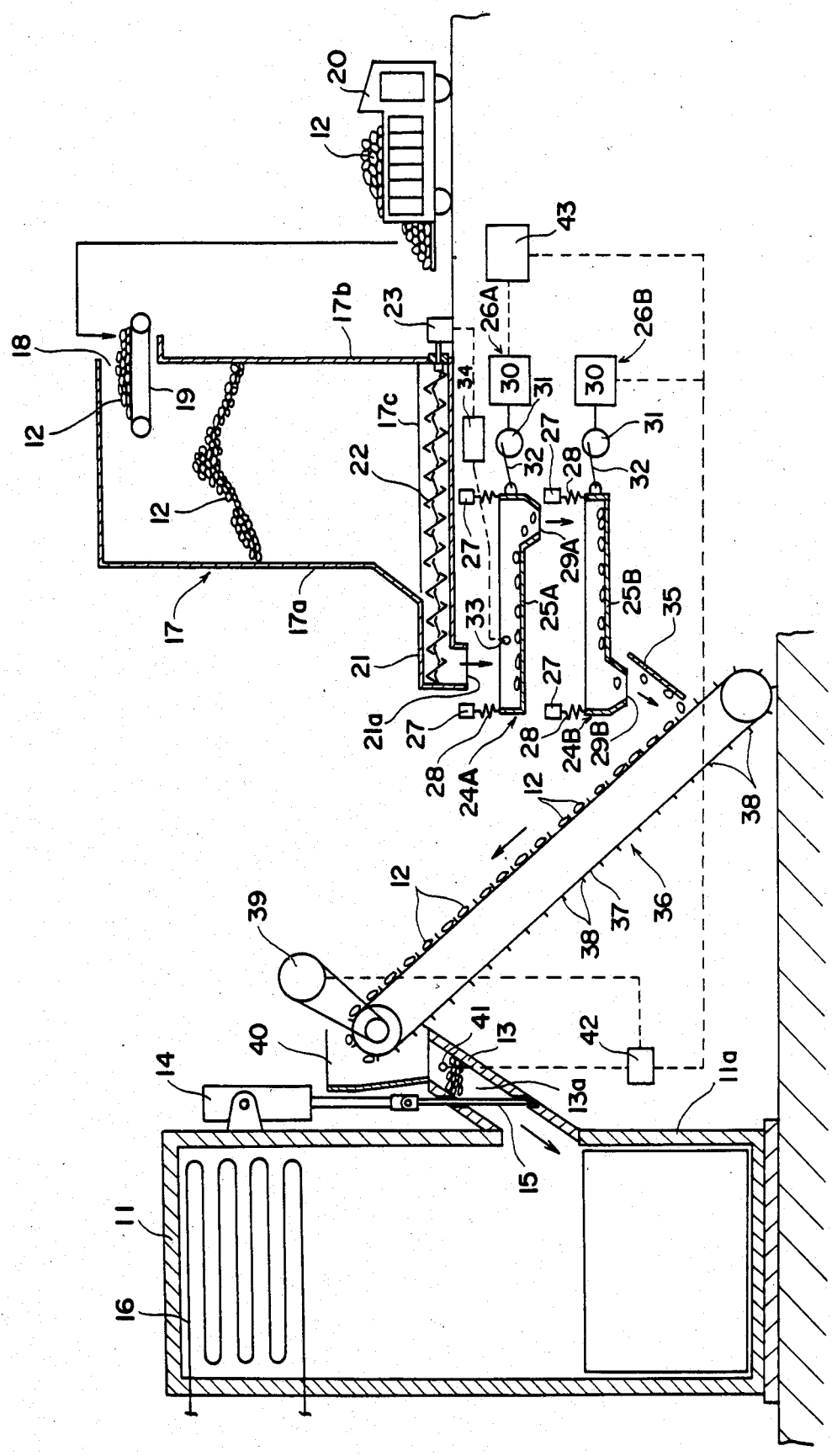

APPARATUS FOR FEEDING WASTE TIRE CHIPS

The present invention relates to an apparatus for feeding waste tire chips to an incinerator.

Presently waste tires are broken into numerous chips by a crusher and then placed into an incinerator by a feeding apparatus to incinerate the chips therein and recover the resulting heat.

The typical apparatus heretofore known for feeding waste tire chips comprises a container having a discharge outlet in its bottom for containing waste tire chips, and a screw feeder having a screw blade which is provided at the bottom of the container inside thereof. By the screw feeder, the chips within the container are charged into an incinerator through the discharge outlet. However, the feeding apparatus, which is not provided with control means for the screw feeder, has the likelihood that chips compressed by the screw blade elastically will enter the incinerator in an excessive amount at a time to cause incomplete combustion.

An object of the present invention is to provide an apparatus for feeding waste tire chips to an incinerator with good stability at all times.

To fulfill the above object, the present invention provides an apparatus for feeding waste tire chips which comprises a container having a discharge outlet at its bottom portion for containing waste tire chips, a screw feeder provided at the bottom of the container for delivering the chips from the container through the discharge outlet, vibrating feeders arranged in a plurality of stages and at least including the uppermost vibrating feeder for receiving the chips delivered from the container and delivering the chips by vibration and the lowermost vibrating feeder for receiving the chips delivered from the uppermost vibrating feeder or from the preceding vibrating feeder and delivering the chips by vibration, a transfer conveyor for transporting the chips delivered from the lowermost vibrating feeder to a feed chute provided for an incinerator, a first sensor for detecting the quantity of chips received by the the uppermost vibrating feeder, first control means for controlling the screw feeder in response to an ouput signal from the first sensor, a second sensor for detecting the quantity of chips within the feed chute, and second control means for controlling at least the lowermost vibrating feeder and the transfer conveyor in response to an output signal from the second sensor.

Various features and advantages of the present invention will be readily understood from the embodiment to be described below with reference to the single accompanying drawing which is a diagram in vertical section showing an apparatus of the present invention for feeding waste tire chips.

With reference to the drawing, indicated at 11 is an incinerator for incinerating chips 12 obtained by cutting waste tires, for example, by a crusher. The incinerator 11 has a side wall 11a and a feed chute 13 projecting from an intermediate portion of the wall for feeding chips. The feed chute 13 is provided at an intermediate portion thereof with a gate 15 which is openable by cylinder means 14. The interior of the chute 13 above the gate 15 serves as a retaining portion 13a for temporarily accommodating chips 12. A heat exchanger 16 for recovering heat is installed in the inner upper portion of the incinerator 11.

The apparatus of the present invention for feeding waste tire chips comprises a container 17 having a front wall 17a and a rear wall 17b and is adapted to contain chips 12 in its interior. The container rear wall 17b is formed at its upper end with an inlet opening 18 which is provided with a feed conveyor 19. The chips 12 transported by a truck 20 are placed onto the feed conveyor 19 by suitable means and placed into the container 17. On the other hand, the container front wall 17a has a discharge duct 21 projecting from its lower end and having a downward discharge outlet 21a. A guide channel 17c is formed at the bottom of the container 17 inside thereof. The guide channel 17c is provided with a shaftless screw blade 22 which is rotatable by rotatingly driving means 23. Accordingly when the screw blade 22 is rotated by the driving means 23, chips are roughly delivered from the discharge outlet 21a of the discharge duct 21.

Disposed below the container 17 are a first vibrating feeder 24A and a second vibrating feeder 24B arranged one above the other. Each vibrating feeder 24 comprises a feeder main body 25 suspended from and supported by a pair of fixed beams 27 by means of springs 28, and a vibrating assembly 26. The main body 25A of the first feeder 24A has an upstream end positioned immediately below the container discharge outlet 21a and a downstream end formed with a delivery outlet 29A. The main body 25B of the second feeder 24B has an upstream end positioned immediately below the delivery outlet 29A of the first feeder main body 25A and a downstream end formed with a delivery outlet 29B. Each vibrating assembly 26 comprises a drive motor 30, a cam disk 31 rotatable by the motor 30, and a link 32 having one end rotatably connected to the cam disk 31 and the other end rotatably connected to the feeder main body 25.

The first feeder main body 25A is provided with a first photoswitch 33 for detecting the quantity of chips passing therethrough. The driving means 23 for rotating the screw blade 22 is controlled by first control means 34 in response to the output signal of the switch 33.

An inclined guide plate 35 is disposed below the delivery outlet 29B of the second feeder main body 25B. A transfer conveyor 36 extends obliquely upward from below the guide plate 35. The transfer conveyor 36 comprises an endless conveyor belt 37 having projections 38 which are arranged at a spacing longitudinally of the belt. The conveyor 36 is driven by drive means 39.

A hopper 40 is mounted on the feed chute 13 of the incinerator 11. The retaining portion 13a within the chute 13 is provided with a second photoswitch 41. The drive means 39 for the transfer conveyor 36 and the drive motor 30 for the second vibrating feeder 24B are controlled by second control means 42 in accordance with an output signal from the switch 41. Indicated at 43 is third control means for controlling the drive motor 30 for the first vibrating feeder 24A. The third control means 43 intermittently operates the drive motor 30 for every delivery period of time which is set, for example, by a timer and further discontinues the intermittent operation of the drive motor 30 preferentially in response to a control signal from the second control means 42.

The feeding apparatus of the foregoing construction operates in the following manner.

The chips 12 within the container 17 are sent forward along the guide channel 17c by the screw blade 22 in rotation and roughly delivered from the discharge outlet 21a of the discharge duct 21 to the first feeder main body 25A. If a large quantity of chips 12 is supplied to the first feeder main body 25A, the first photoswitch 33 detects this and produces an output signal, in response to which the first control means 34 controls the driving means 23 to stop the rotation of the screw blade 22. Since the first feeder main body 25A is intermittently vibrated by the upper vibrating assembly 26A under the control of the third control means 43, the operation of the main body 25A intermittently causes chips 12 to fall from the delivery outlet 29A onto the second feeder main body 25B. By the vibration given by the lower vibrating assembly 26B, the chips 12 on the second feeder main body 25B are caused to flow more uniformly, delivered from the delivery outlet 29B and supplied to the lower end of the transfer conveyor 36 while falling along the guide plate 35. Through the cooperation of the conveyor belt 37 and projections 38, the transfer conveyor 36 transports the chips 12 upward to the hopper 40, whereby the chips 12 are supplied to the feed chute 13 which is closed with the gate 15. When at least a specified quantity of chips 12 has been accumulated in the retaining portion 13a of the feed chute 13, the second photoswitch 41 detects this, whereupon the second control means 42 controls the lower vibrating assembly 26B and the drive means 39 for the transfer conveyor 36 in accordance with the output signal from the swtich 41 to discontinue the delivery of chips by the second feeder main body 25B and the transport of chips by the transfer conveyor 36. The control means 42 also causes the third control means 43 to stop the upper vibrating assembly 26A. The gate 15 is opened, and the specified quantity of chips 12 is placed into the incinerator 11 for complete combustion. The resulting heat is recovered by the heat exchanger 16.

Although the upper and lower vibrating feeders 24A and 24B are disposed in two stages below the container 17 according to the above embodiment, vibrating feeders may be provided in three or more stages. In this case, the first photoswitch 33 is provided for the uppermost vibrating feeder, the second control means 42 controls the vibrating assembly for the lowermost vibrating feeder, and the third control means 43 controls the vibrating assemblies for the vibrating feeders other than the lowermost. When desired, the control signal from the second control means may be fed to the third control means to stop all the vibrating feeders at the same time.

What is claimed is:

1. An apparatus for feeding waste tire chips comprising a container having a discharge outlet at its bottom portion for containing waste tire chips, a screw feeder provided at the bottom of the container for delivering the chips from the container through the discharge outlet, vibrating feeders arranged in a plurality of stages and at least including an uppermost vibrating feeder for receiving the chips delievered from the container and delivering the chips by vibration and a lowermost vibrating feeder for receiving the chips delivered from the uppermost vibrating feeder or from an immediately preceding vibrating feeder and delivering the chips by vibration, a transfer conveyor for transporting the chips delivered from the lowermost vibrating feeder to a feed chute provided for an incinerator, a first sensor for detecting the quantity of chips received by the uppermost vibrating feeder, first control means for controlling the screw feeder in response to an output signal from the first sensor, a second sensor for detecting the quantity of chips within the feed chute, second control means for controlling at least the lowermost vibrating feeder and the transfer conveyor in response to an output signal from the second sensor, and third control means for intermittently operating the uppermost vibrating feeder in timed delivery periods and for discontinuing such intermittent operation in response to an output signal from the second sensor.

2. An apparatus as defined in claim 1 wherein the output signal from the second sensor is supplied to the third control means by the second control means.

3. An apparatus as defined in claim 1 wherein the feed chute for the incinerator is adapted to contain a specified quantity of tire chips as detected by the second sensor.

* * * * *